United States Patent [19]

Takeda

[11] Patent Number: 5,320,582

[45] Date of Patent: Jun. 14, 1994

[54] CHAIN DRIVING UNIT

[75] Inventor: Tetsuya Takeda, Yamagata, Japan

[73] Assignee: NEC Corporation, Tokyo, Japan

[21] Appl. No.: 983,162

[22] Filed: Nov. 30, 1992

[30] Foreign Application Priority Data

Nov. 29, 1991 [JP] Japan .................. 3-315935

[51] Int. Cl.$^5$ .............................. F16H 7/14
[52] U.S. Cl. .................. 474/140; 74/89.21; 474/153
[58] Field of Search ............. 474/140, 153, 155, 156, 474/158, 160, 900; 198/850, 851, 853; 74/89.21; 30/383-385

[56] References Cited

U.S. PATENT DOCUMENTS 4,498,890 2/1985 Sutherland .................. 474/140

Primary Examiner—Douglas D. Watts

[57] ABSTRACT

An apparatus for driving a chain in which expansion and contraction of the chain due to an angular position of a sprocket is eliminated, the tensile stress imposed to the chain is reduced so that the chain travels smoothly. A guide cam is provided, which has a guide groove, one end of which is opened at a predetermined peripheral position of a sprocket where the rollers of the chain are released from the sprocket. The cam guides the rollers of the chain so that a winding angle of the chain around the sprocket is kept at a constant value and a constant traveling orbit is maintained irrespective to the angular direction of the sprocket.

1 Claim, 6 Drawing Sheets

CHAIN DRIVING UNIT

BACKGROUND OF THE INVENTION

1. Field of the Invention

The present invention relates to an apparatus for driving a chain, more particularly an endless long link chain or a pallet link chain, which is used for conveying and/or positioning a variety of parts or objects.

At first, in order to facilitate understanding of the present invention, a known chain diving unit or a pallet link chain will be described with reference to FIGS. 1-3.

DESCRIPTION OF THE RELATED ART

In a known chain diving unit shown in FIG. 1, an endless chain 2 runs between a driving sprocket 1 and a tension sprocket 1' spaced at a predetermined distance from the driving sprocket 1. The driving sprocket 1 is driven by a driving source or index driver 5. Waving or swinging motion of the chain 2 is restricted by linear guides 3.

The chain 2 driven by the driving sprocket 1 is under tensioned condition and the value of tension given to the chain 2 varies and depends on an angular position of the sprocket 1. FIG. 2A illustrates the least tensioned moment of the chain 2, while FIG. 2B illustrates the most tensioned moment thereof. The tension imposed to the chain 2 increases when the numbers of rollers 2b engaged with the sprocket 1 increase (in other words, when a winding angle $\theta$ of the chain 2 around the sprocket 1 becomes larger).

The resulting expansion-contraction motion of the chain 2 is repeated cyclically when the driving sprocket 1 revolves, resulting in that the chain 2 swings or vibrates cyclically. In the known apparatus, in order to reduce or eliminate such undesirable swinging or vibration motion of the chain 2, linear guides 3 are positioned between the sprockets 1, 1'' so that slack of the chain 2 is absorbed.

The "difference of expansion and contraction: D" caused by tensioning and loosening of the chain 2 can be calculated geometrically from FIG. 3 and is represented by the following equation:

$$D = 4\left[\left(2L - L\frac{B}{A}\right) - (\sqrt{(2L)^2 - R^2(1 - \cos B)} - R \sin B)\right]$$

in which L is a link pitch, R is a radius of a pitch circle of the sprocket 1, A is the pitch angle corresponding to an angle after the sprocket 1 rotates at one pitch, and B is any angle when the sprocket 1 is rotated as is shown in FIG. 3.

The difference of expansion and contraction "D" is such a big value as about 2 mm, for example, in the case when the sprocket 1 has 8 tooths and R is 65 mm and each link has a length of 50 mm. This difference in expansion and contraction "D" becomes larger when the length of the link becomes longer.

In the known chain driving units, outwards swinging motion of the chain 2 produced when the chain is loosened is eliminated or absorbed compulsorily by means of the linear guide 3 or a tension roller which forces or biases the chain 2 towards one direction. Although slack of the chain 2 can be eliminated or absorbed by the linear guide 3 or the like which tensions the chain 2 at the period when the chain 2 is loosened, the tensile stress is imposed on the chain 2 at the period when the chain 2 is in an extended condition. The chain is subjected to this tensile stress repeatedly and with shock. Such repeating shock stress results in a cause of creep of the chain 2, so that the chain 2 is plastically deformed and hence the chain driving unit will not work smoothly.

SUMMARY OF THE INVENTION

An object of the present invention is to solve the problem and to provide an improved chain driving unit in which the difference of expansion and contraction "D" is reduced as small as possible and to reduce the tensile stress imposed on the chain, so that the chain driving unit works smoothly.

The present invention provides an apparatus for driving a chain, comprising a driving sprocket, an endless chain running between the driving sprocket and a tension sprocket spaced at a predetermined distance from the driving sprocket, and a driving source for driving and indexing the driving sprocket, the apparatus being provided with a guide cam having a guide groove whose one end opens at a predetermined peripheral position of the sprocket and extending from the predetermined peripheral position to a travelling direction of the chain, so that the rollers of the endless chain are released from the sprocket and guides.

An orbit of the guide groove includes preferably a pitch circle of the sprocket. In a preferred apparatus according to the present invention, four guide cams are arranged at entering and exiting zones of the chain. The guide cam located at the exiting zone has such a cam profile that each roller of the chain is successively delivered from the sprocket to the guide cam at a predetermined peripheral position (the first position) of the sprocket, is guided along a pitch circle of the sprocket, is released from the sprocket at another predetermined peripheral position (the second position), guided further by the guide cam, and then finally separates from the guide cam. The guide cam located at the entering zone has the same cam profile. Namely, rollers of the chain successively engage with the guide cam at the second position of the sprocket, are guided by the guide cam to the first position where each roller is delivered successively from the guide cam to the sprocket, are guided along a pitch circle of the sprocket, and then are released from the guide cam to the sprocket at the first position.

If necessary, at the second position, the rollers of the chain may be passed from the guide cam of the present invention to the conventional linear guide.

The present invention will be described with reference to the attached drawings.

DESCRIPTION OF THE PREFERRED EMBODIMENT

Figure 1:
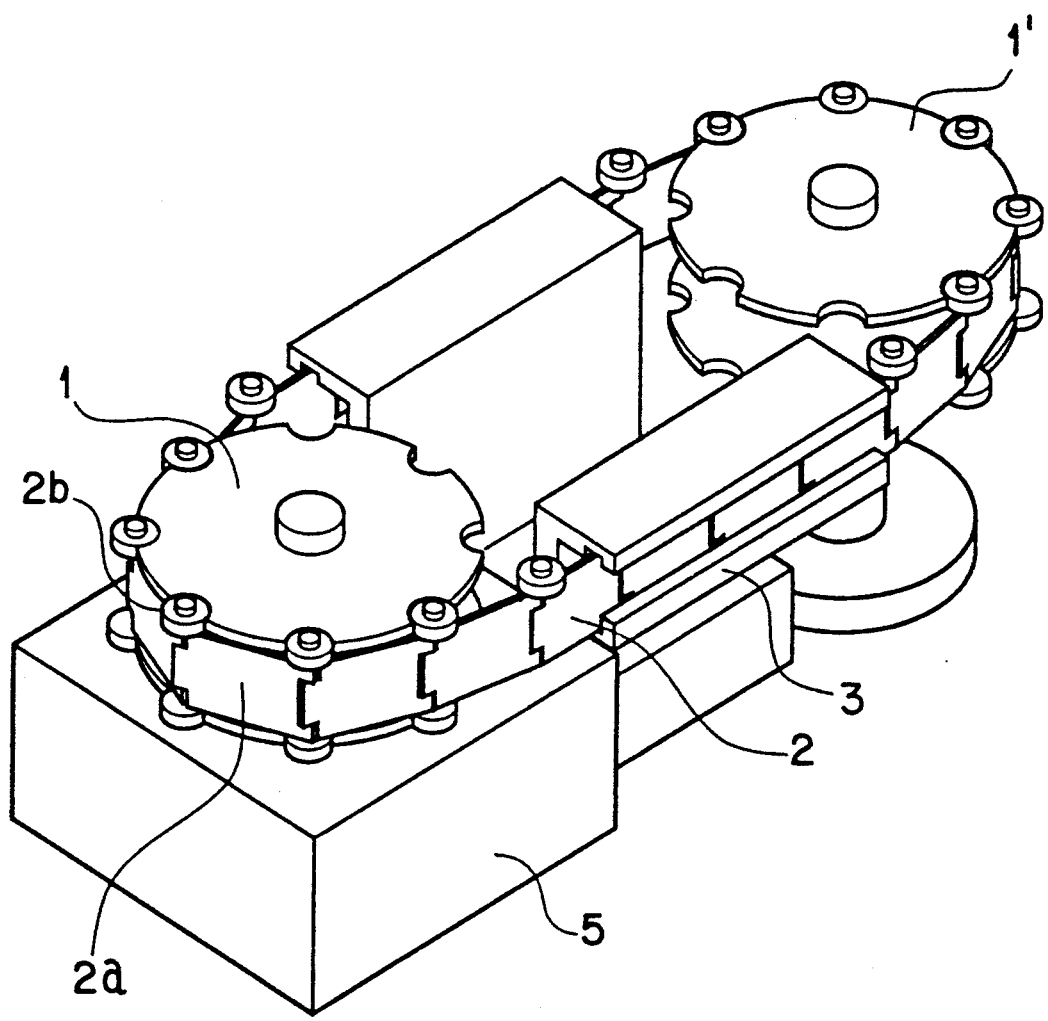
FIG. 1 is a perspective view of a known chain diving unit.
Figure 2A:
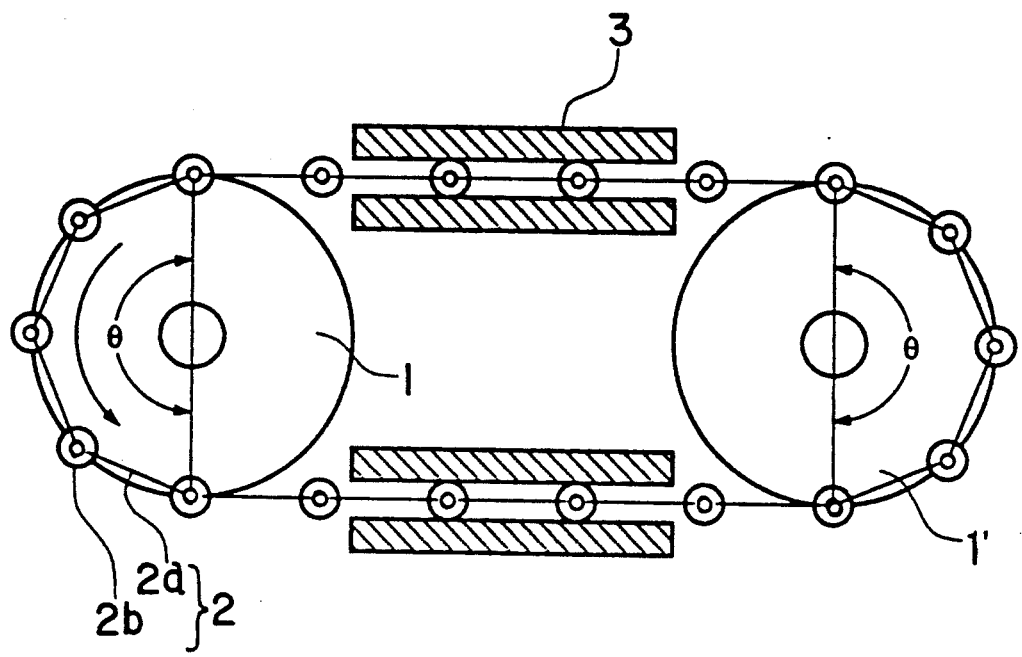
FIGS. 2A and 2B each illustrates an endless chain diving unit shown in FIG. 1 at a different moment.
Figure 2B:
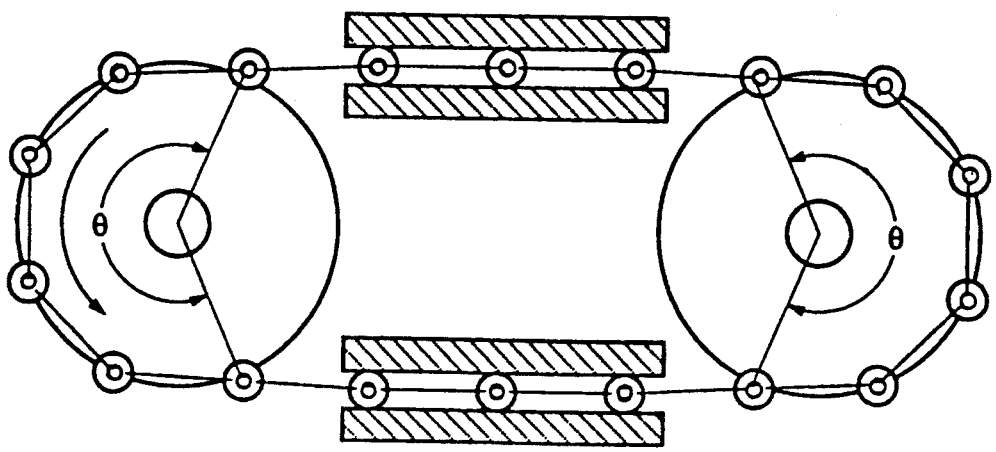
Figure 3:
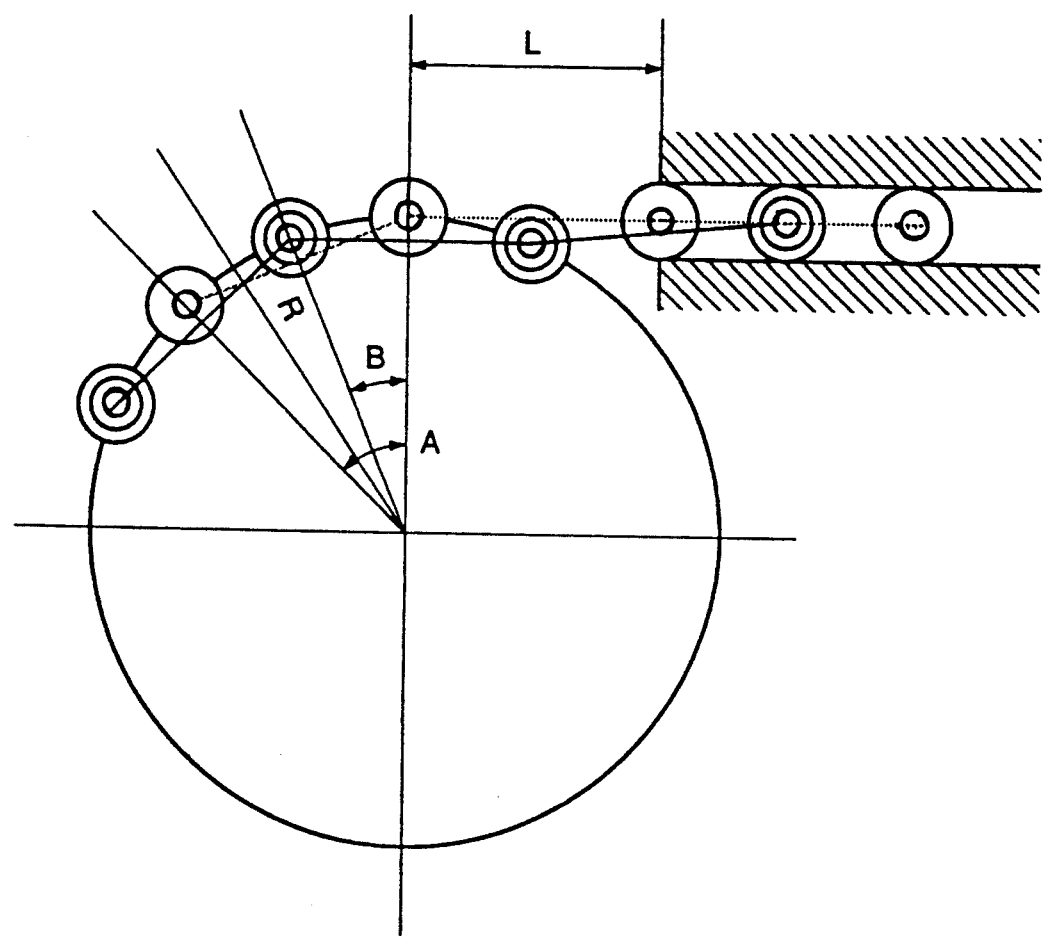
FIG. 3 is an illustrative view for explaining expansion and contraction of the known chain.
Figure 4:
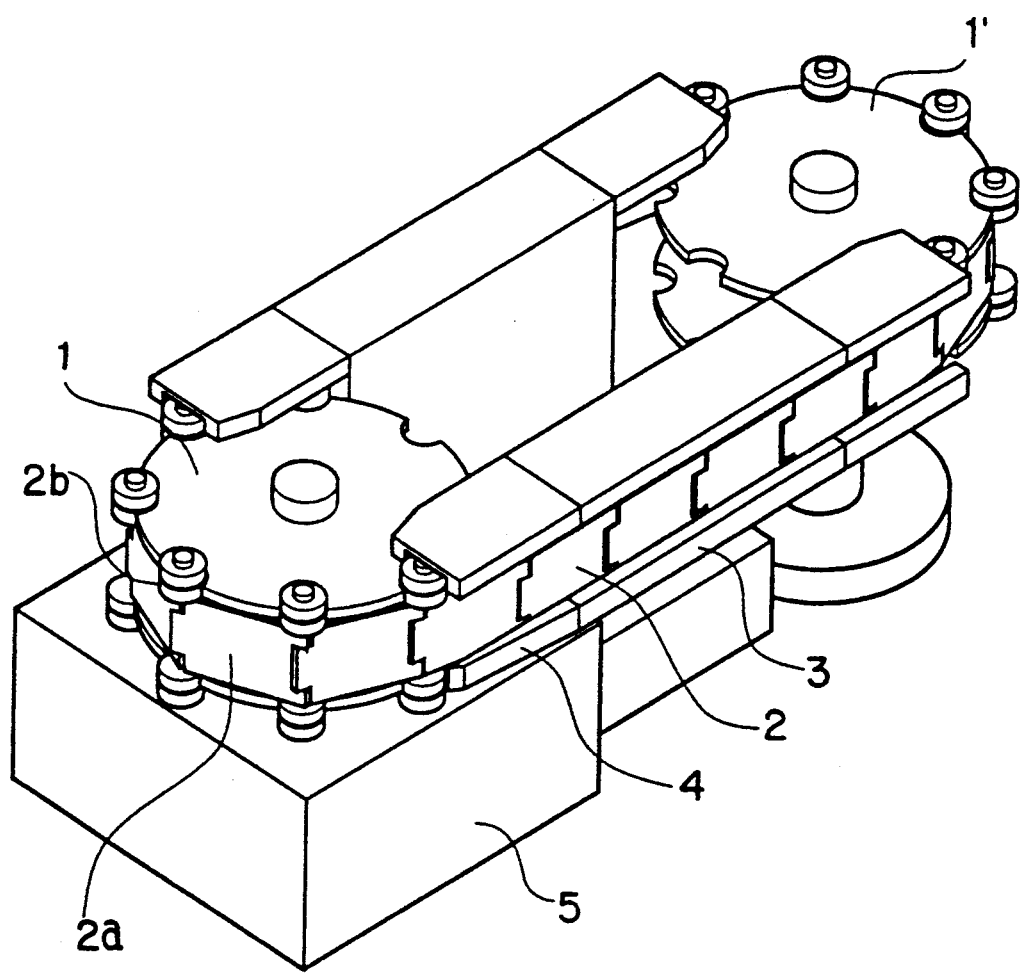
FIG. 4 is a perspective view of an embodiment of a chain diving unit according to the present invention.
Figure 5A:
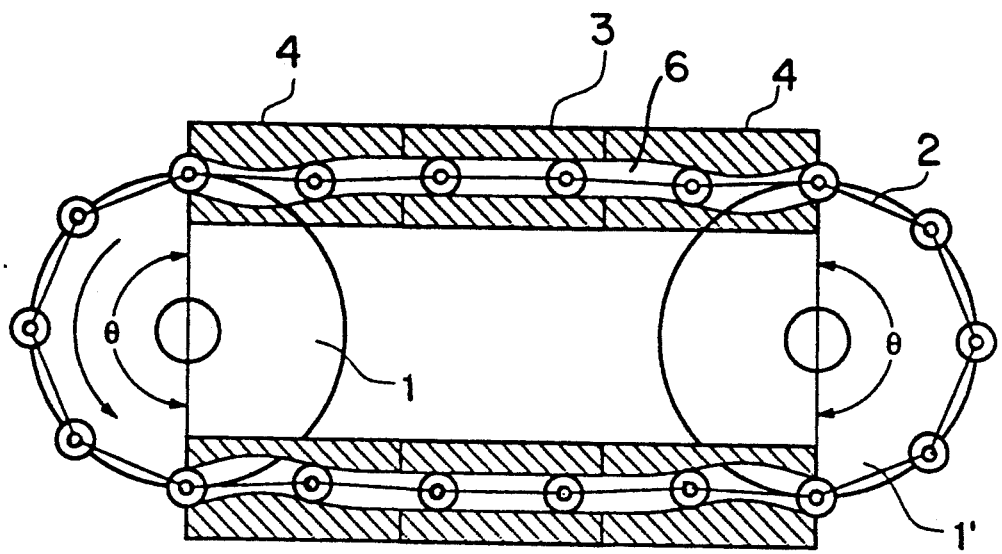
FIGS. 5A and 5B each illustrates an endless chain of the chain diving unit shown in FIG. 4 at a different moment.
Figure 5B:
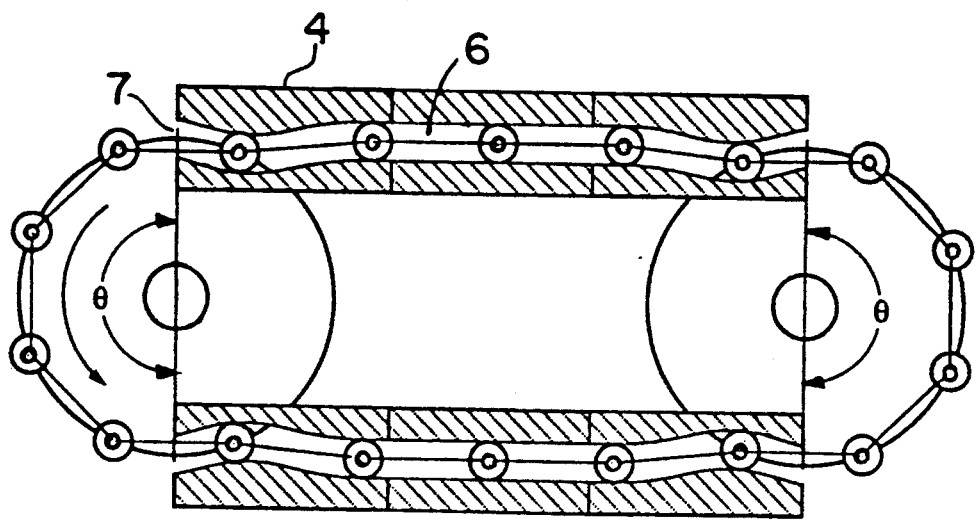
Figure 6:
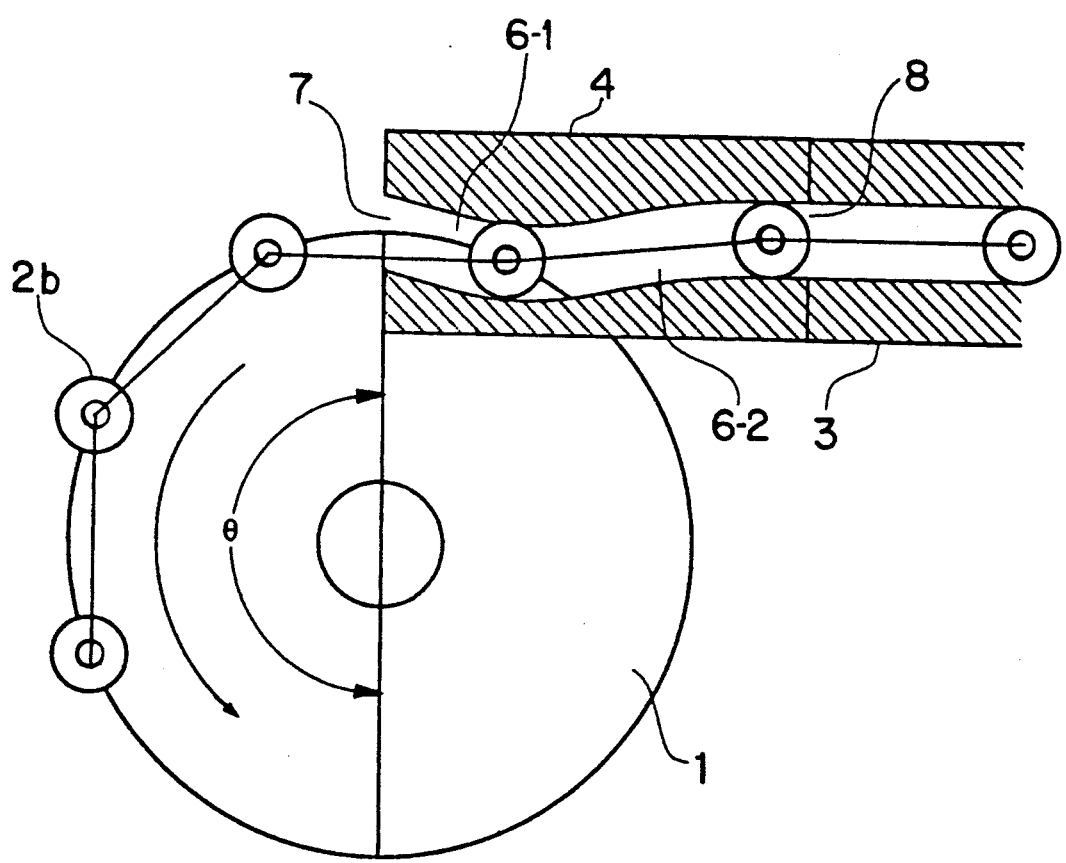
FIG. 6 is an illustrative view for explaining an embodiment of a guide cam profile according to the present invention.

FIG. 4 is a perspective view of an embodiment of a chain diving unit according to the present invention. FIG. 5A and FIG. 5B are views each illustrating a chain driving mechanism for the chain diving unit shown in FIG. 4 at a different moment. FIG. 6 is an illustrative view for explaining an embodiment of a guide cam profile according to the present invention.

The chain diving unit according to the present invention has four guide cams 4 each having a guide groove 6 whose first end 7 is opened at a predetermined position of a sprocket 1 in such a manner that a winding angle $\theta$ of the chain 2 around the sprocket 1 is kept at a constant value irrespective of the angular position of the sprocket and the rollers 2b separating from the sprocket 1 are guided successively along the guide groove 6. In an example shown, two first ends 7 of two guide cams 4 are opened at diametrically opposite ends of the sprocket 1 and the winding angle $\theta$ of the chain is 180°.

The guide groove 6 has preferably such an orbit that the guide groove 6 opens at the first peripheral position 7 of the sprocket, has an arced groove 6-1 extending along a pitch circle of the sprocket 1 and communicated with a linear groove 6-2 which can communicate with a guide groove of the conventional linear guide 3 at an opposite end 8, if necessary. Two grooves 6-1 and 6-2 are communicated smoothly through a transition zone.

According to the present invention, when the sprocket 1 is revolved, the chain 2 is guided by the guide cam 4. Therefore, in a condition shown in FIG. 5A where the least tension is given to the sprocket 1, the rollers 2b released from the sprocket 1 at exiting zones are forced to be guided in the groove of the guide cam 4, so that longitudinal swinging motion of the chain is eliminated, while in a condition shown in FIG. 5B where the greatest tension is given to the sprocket 1, the rollers 2b are released from the sprocket 1 at exiting zones and are forced to be guided in the groove of the guide cam 4, so that the longitudinal swinging motion of the chain is eliminated. Thus, in the apparatus according to the present invention, loosening of the chain is eliminated by keeping a constant winding angle $\theta$ of the chain 2 during the time when the sprocket is revolved, so that the chain itself is not subjected to expansion/contraction and/or vibration, resulting in that the chain driving unit works smoothly.

In the above-mentioned embodiment, the conventional linear guide 3 can be combined with the guide cam of the present invention. This linear guide 3 is not necessary when the space between the sprockets is short.

The apparatus according to the present invention has such merits that expansion and contraction of the chain can be eliminated and the chain driving unit can operate smoothly without imposing unnecessary tensile stress, by using the guide cam which can keep the winding angle of the chain at a constant value so that rollers follow a constant travelling orbit.

I claim:

1. An apparatus for driving a chain, comprising a driving sprocket; a tension sprocket spaced at a predetermined distance from said driving sprocket and having the same diameter; an endless chain running between said driving sprocket and said tension sprocket; a driving source for driving and indexing said driving sprocket to drive said chain; and a cam profile guide including a plurality of adjacent cam guides, said guide cams having guide grooves communicating with each other for guiding said endless chain between said driving sprocket and said tension sprocket, said guide grooves including end guide grooves of two end guide cams positioned at said driving and tension sprocket, respectively, and opened at diametrically opposite distal ends thereof at locations adjacent said driving and tension sprocket, respectively, and intermediate guide grooves extending between said two end guide cams and being parallel and linear in shape, said end guide grooves of said end guide cams each including an arched groove portion extending along a pitch circle of an adjacent one of said driving and tension sprocket, respectively, and a transition groove portion merging into the intermediate guide groove linear in shape of an adjacent guide cam in such a manner that a winding angle of said chain around each sprocket is maintained at a constant value irrespective of an angular position of each sprocket.

* * * * *